May 28, 1968 G. C. KINNAMON ET AL 3,385,312
FLUID REGULATOR CIRCUIT
Filed Nov. 1, 1965
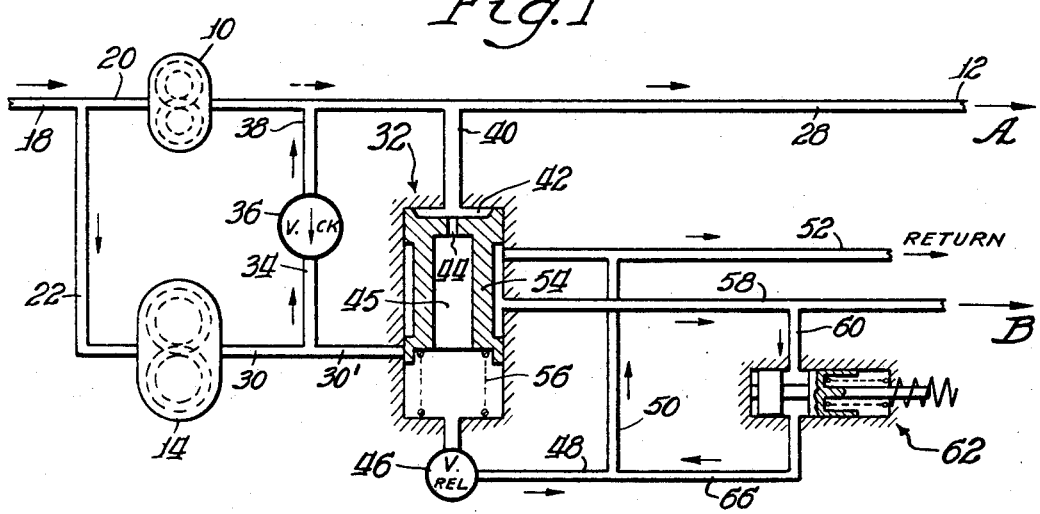
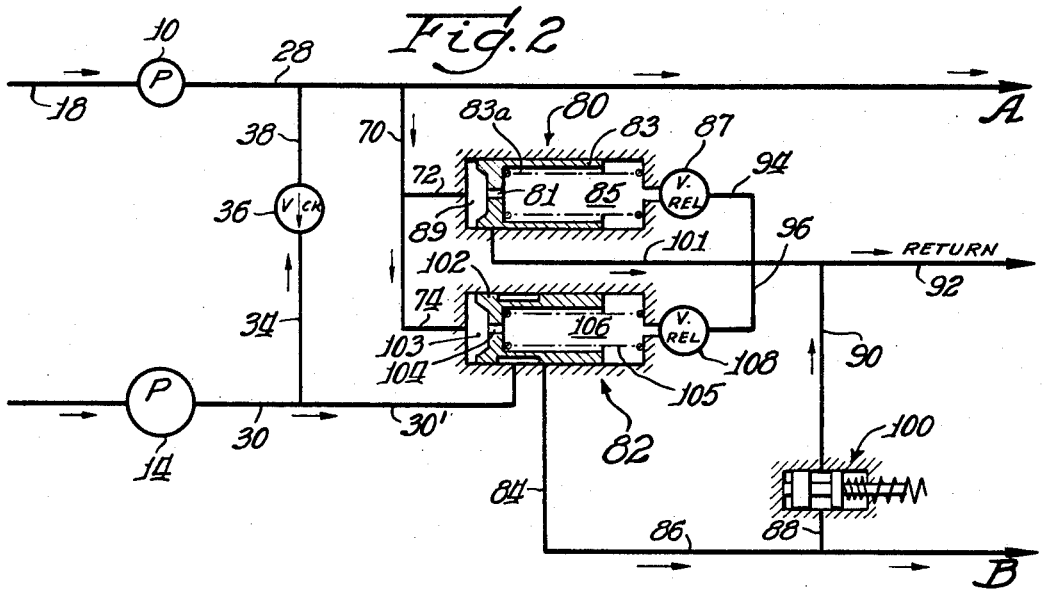
Inventors:
George C. Kinnamon
and Francis E. Norlin
By: Robert L. Zieg Atty.

United States Patent Office 3,385,312
Patented May 28, 1968

3,385,312
FLUID REGULATOR CIRCUIT
George C. Kinnamon, Lyndhurst, and Francis E. Norlin, Chesterland, Ohio, assignors to Borg-Warner Corporation, Chicago, Ill., a corporation of Illinois
Filed Nov. 1, 1965, Ser. No. 505,897
4 Claims. (Cl. 137—118)

This invention relates to a fluid regulator circuit for supplying fluid to hydraulically actuated mechanisms and motors and more particularly to a circuit and a method for supplying fluid to systems where the fluid pressure requirements vary during operation.

Prior to this invention, variable displacement pumps such as piston pumps were used to regulate and supply hydraulic fluid to hydraulic motors and actuators in systems utilizing hydraulic actuators such as aircraft, road equipment, and the like. It is well known that variable displacement piston and vane pumps are relatively uneconomical due to their initial cost as well as maintenance and repair costs. The variable displacement pumps also tend to be less reliable than many of the fixed displacement pumps.

Utilizing a single pump, either fixed or variable displacement, to supply a system or plurality of systems, has a reliability limitation inasmuch as there are no economical means of providing an alternate supply of fluid if there is a pump failure.

Due to the problems encountered with variable displacement pumps, it was desired to provide hydraulic power by means of pumps having two or more fixed displacement elements.

In order to utilize fixed displacement pumps, it was first necessary to eliminate certain inherent problems in those systems operated by fixed displacement pumps. Two main problems of fixed displacement pumps were their excessive power consumption and system heating. These problems normally resulted from the necessity of providing a pump of sufficiently high capacity to meet the intermittent maximum flow requirements of a given system. With the flow of a fixed displacement pump being constant and maximum at all times, it was necessary to bypass a certain amount of flow at high pressure, i.e., that flow not being utilized by the system. This bypassed flow caused system heating as well as power loss.

Briefly described, this invention is a fluid regulator circuit and method for supplying fluid to a series of hydraulic systems, which circuit and method minimizes system heating and which is more efficient, from the standpoint of power consumption, than a system utilizing a single fixed or variable displacement pumping element. The invention is illustrated as it may be utilized to operate at least two hydraulic systems on an aircraft jet engine. The first system, operated in accordance with this invention, is the nozzle area control system used for varying the jet engine thrust, which system is used continuously at varying flows and pressures. The second system, which is operated along with the first system, is the thrust reverser actuation system which utilizes high pressures only intermittently. In accordance with the method of this invention, the two systems are operated by means of a plurality of fixed displacement gear pumping elements operating in conjunction with appropriate valves.

The fluid regulator circuit, exemplary of this invention, as described hereinbelow, supplies fluid from a fluid source to two hydraulic systems A and B, wherein the first system A operates within a first pressure range of $P_1$ and requires priority over the second system B. The second system has a common operating pressure range of $P_2$, which range is lower than range $P_1$. In an alternate condition, while system A is at pressure level $P_1$, the flow of system B is bypassed at minimum pressure. A relief valve, limiting pressure in both systems, operates in a still higher pressure range $P_3$.

The positive displacement pumping elements described herein are of the gear type, however, may be any other fixed displacement pumping elements. The pumping elements communicate with each other by conduit means and may be driven coaxially by the same power source (not shown). The pumps may be driven by separate power sources, however, this would normally result in greater weight problems. It will be noted that this invention is especially adapted to operate with a series of systems wherein the second or subsequent systems operate at high pressures only intermittently. In accordance with this invention, there is a first pumping element to supply fluid pressure to the first system and a second pumping element to back up or supplement the first. In this manner, flow from a second pumping element is available to supplement high pressure flow to the first system when needed. Inasmuch as there is a second back-up pumping element, the size of the first pumping element supplying the first system may be drastically reduced.

The advantages of this invention for supplying fluid to a plurality of systems will become apparent from a reading of the following specification taken in conjunction with the accompanying drawings in which:

FIGURE 1 is a schematic flow diagram showing the operating of this invention on the hydraulic control system of an aircraft; and FIGURE 2 is a schematic flow diagram showing two priority and relief valves as an alternate system to the single valve system of FIGURE 1.

Referring now to the drawings, there are shown regulator supply circuits for supplying hydraulic fluid to (1) a nozzle area control actuation system A and (2) an actuation system for operating a thrust reverser B. System A normally requires flow at a rate substantially below its maximum flow rate. The pressure range required by system A is hereinafter designated as pressure range $P_1$.

System B requires flow at high pressure only for short periods at infrequent intervals. The pressure range of system B during these intermittent periods is less than $P_1$, and is hereinafter designated at pressure range $P_2$. No high pressure flow is required by system B except during the intermittent periods. A low pressure cooling flow may, however, in some instances, be required or desired.

As shown in FIGURES 1 and 2, hydraulic fluid is obtained from a hydraulic fluid source (not shown) and enters the supply circuit via an inlet port 13 and passes to a first gear pump 10 via conduit 20 and a second gear pump 14 via conduit 22. There may be separate inlets, however, for purposes of illustration, there is a common inlet 18.

Referring to FIGURE 1, hydraulic fluid is pressurized by pumping element 10 and flows via conduit 28 and outlet port 12 to a system A. The flow passing through conduit 28 from pumping element 10 operates system A within the pressure range $P_1$.

The hydraulic fluid that passes into pumping element 14 is pressurized and passed via conduits 30 and 30' to priority and relief valve 32. At an operating pressure range below $P_1$, the fluid is interrupted by priority and relief valve 32 and does not pass through conduit 30'. At a pressure range below $P_1$, fluid is diverted via conduit 34 into check valve 36 and passed through check valve 36 to conduit 38; thus fluid from pump 14 joins fluid passing from gear pump 10 via conduit 28 to supply system A.

When the combined flows of pumping elements 10 and 14 exceeds the flow demand of system A, the oversupply of flow causes the pressure in conduit 28 to increase to pressure range $P_1$. The pressure $P_1$ is exerted through conduit 40 into chamber 42 of priority and relief valve 32.

The pressure within valve 32 is sensed through orifice 44 in spool 54 and through chamber 45 to act against pilot relief valve 46 at the base of valve 32. Pilot relief valve 46 is set to open when pressure exceeds the requirements of the operating pressure of system A, i.e., pressure range $P_1$. Within pressure range $P_1$, a small amount of flow escapes through pilot valve 46, flows via lines 48 and 50 to return line 52. Return line 52 is in communication with the fluid source (not shown). As fluid flows through orifice 44, a pressure differential results between chambers 42 and 45, which causes spool 54 of priority and relief valve 32 to move downwardly against the resistance of spring 56 placing line 30′ in communication with conduit 58. Pumping element 14 then discharges a portion or all of its flow through the priority and relief valve 32 into line 58 to system B.

While system A pressure is maintained within pressure range $P_1$, pilot relief valve 46 continues to bypass a small amount of flow and spool 54 maintains its downward position, i.e., allows flow from pumping element 14 to pass via line 30′ through valve 32 into conduit 58. It will be noted that conduit 58 is in communication with conduit 60 which leads to a normally open solenoid valve 62. Therefore, while system A is operating within pressure range $P_1$, its required fluid flow is provided by pumping element 10 alone. The flow from pump 14, within pressure range $P_1$, when not utilized by system B, is vented through conduit 60, past the normally open solenoid valve 62 and in turn via conduit 66 into conduit 50 to return. As mentioned, the flow from return conduit 52 is placed in communication with the fluid source. While the output of pumping element 14 is flowing in this lower pressure path, little power is consumed except that required by pumping element 10.

When a high pressure is required in system B, a throttle quadrant (not shown) or other device, closes an electrical circuit energizing solenoid valve 62 preventing passage through conduit 60 to return. The closed solenoid causes an increase of pressure in system B. During those periods, when system B requires fluid flow from conduits 30′ and 58, this flow enters system B directly. The pressure of system B at this time is determined by system B demand and may be a pressure $P_2$ below pressure range $P_1$. If the entire flow of either system is not utilized, pressure in cavity 42 of valve 32 increases. The increased pressure is transmitted through orifice 44 and chamber 45 and causes relief valve 46 to bypass flow at a higher rate. The increased flow passing through orifice 44 also causes a pressure differential to exist between cavities 42 and 45. This differential moves spool 54 downwardly to place chamber 42 in communication with return line 52, thus relieving excess flow at a third pressure of $P_3$ which is a higher pressure than operating pressure ranges $P_1$ or $P_2$.

Following completion of the high pressure requirements of system B, the throttle quadrant is placed in the normal position which breaks the circuit to solenoid valve 62 and allows it to return to its normal open position. Thus, communication to conduit 66 is established and fluid will flow to return via conduits 66, 50 and 52 as above stated.

It will be noted that when system A requires less than the full capacity flow of pumping element 10, the excess is diverted through line 40 into chamber 42 to move spool 54 in the manner above-described. This will place chamber 42 in communication with line 52 and relieve excess flow from gear pump 10. During periods when system B is at high pressure, i.e., when the solenoid valve has been energized, any excess flow from pumping element 14 not utilized by system B is relieved by the same route, the excess flow first being forced through conduit 34, check valve 36, and conduits 38, 28 and 40.

When the flow demand of system A exceeds the capacity of pumping element 10, there is a pressure drop in conduit 28 which also results in a pressure drop in conduit 40. The pressure drop causes valve 46 to close slightly, decreasing the flow through orifice 44 as well as the pressure differential between chambers 42 and 45. As a result, spring 56 urges spool 54 upwardly to partially close the passage of fluid via line 30′ through priority and relief valve 32. Thus, a portion of the flow from pumping element 14 that normally passes through valve 32 and conduit 58 to system B is caused to pass via conduit 34 through check valve 36 and via conduit 38 into conduit 28 to join the fluid supply from pumping element 10 to supplement the fluid requirements of system A. As fluid flow in conduit 28 exceeds the requirements of system A, there is a pressure increase in conduit 40 and chambers 42 and 45 which causes valve 46 to open wider increasing the rate of flow through valve 46 and orifice 44. This causes the pressure differential between chambers 42 and 45 to increase which in turn, causes spool 54 to again move downwardly. Pilot valve 46 senses pressure changes in system A and in conjunction with orifice 44, causes the spool 54 to assume a position that will result in the flow demands to system A being met, with all excess flow being bypassed. It will be noted that the position of priority and relief valve spool 54 changes in accordance with flow requirements in the system, as above described, to modulate the amount of flow that is bypassed.

During normal operation of this system, the high pressure flow in pumping element 10 discharges into system A and low pressure flow from pumping element 14 passes through line 30′ through priority and relief valve 32 into conduits 58 and 60 past open solenoid valve 62, conduits 66, 50, and 52 to source. The intermediate position of valve spool 54 allows full flow of pumping element 14 through valve 32.

Should pumping element 10 fail, pumping element 14 will supply flow through check valve 36 as above-described and meet the requirements of system A and priority and relief valve 32 will then act as a pilot operated relief valve.

Referring now to FIGURE 2, hydraulic fluid is pressurized by pumping element 10 and passed via conduit 28 and outlet port 12 to system A. The flow passing through conduit 28 from pumping element 10 operates system A within the operating pressure range $P_1$.

The hydraulic fluid that passes into pumping element 14 is pressurized and passed via conduits 30 and 34, check valve 36, and conduits 38 and 28 to combine with the flow from pump 10 to satisfy the requirements of system A.

If the flow requirements of system A are less than the total combined flows from pumping element 10 and 14, there will be a pressure rise in conduit 28 which will be exerted through conduit 70 as well as branch conduits 72 and 74 leading to a pair of valves 80 and 82 respectively.

Valve 82 is a flow control valve and valve 80 is a pressure relief valve. Pilot relief valve 80 contains a chamber 89, spool 83 with orifice 81, chamber 85, pilot valve 87 and a spring 83a urging spool 83 to the left as viewed in FIGURE 2.

If the flow requirements of system A are fulfilled and pressure increases to $P_3$, the flow in conduit 72 will enter chamber 89 of relief valve 80 and in turn through orifice 81 of spool 83 to exert force on pilot relief 87, causing it to open and bypass fluid through conduits 94 and 96 to return. If the pressure differential between chambers 89 and 85 due to the opening of valve 87 is sufficiently great, spool 83 will be forced to the right causing chamber 89 to be placed in communication with a conduit 101 and return 92.

Throughout the operating pressure range $P_1$, during the operation of system A, fluid is passed from both pumping elements 10 and 14 as above-mentioned via conduit 28 into system A. After the flow requirements of system A are satisfied, the pressure in conduit 28 is increased which increases the pressure within conduit 70 to exert pressure on flow control valve 82.

Control valve 82 contains a chamber 103, spool 102 with orifice 104, a spring 105 urging spool 102 to the left as viewed in FIGURE 2, chamber 106, and a pilot relief 108. The flow entering valve 82 passes from chamber 103 of valve 82 through orifice 104 in spool 102 to chamber 106. This flow exerts pressure on pilot valve 108 which is set to open at pressure $P_3$. It will be noted that as spool 102 of valve 82 moves to the right against spring 105, conduits 84 and 86 are placed in fluid communication with a conduit 30' and receive excess flow from pumping element 14 not required by system A. If system B has flow requirements the normally open solenoid valve 100 is closed, diverting flow from conduit 86 to system B.

It will be noted that the system shown in FIGURE 2 operates in essentially the same manner as that system shown in FIGURE 1. In both of the circuits shown in FIGURES 1 and 2, system A is given preference over system B and pumping element 14 serves as a back-up pump and a guarantee of fluid pressure supply to system A irrespective of whether or not the pumping element 10 is operating.

It will be understood that while this invention has been described in connection with two hydraulic control systems on aircraft, that this is by way of illustration and not by way of limitation. The scope of this invention is defined solely by the appended claims which should be construed as broadly as the prior art will permit.

We claim:

1. A fluid regulator circuit for supplying fluid from a fluid source to first and second hydraulic systems wherein said first system requires priority over said second system, which circuit is comprised of:

first and second pumping elements in fluid communication with said fluid supply source, said first pumping element connected by first conduit means to said first system, said second pumping element connected to said second system by second conduit means;

third conduit means interconnecting said first and second conduit means;

valve means situated in said third conduit means, said means adapted to check flow in said first conduit from entering said second conduit means, said means further adapted to permit flow from said second conduit means to said first conduit means when the pressure within said first conduit means is lower than in said second conduit means;

first valve means connected to said first and second conduit means, said valve means adapted to direct flow from said second pumping element to said first system and adapted to direct flow to said second system after flow requirements of said first system are satisfied, and by-pass excess flow from said first and second pumping elements to said fluid source; and solenoid valve means in communication with said second systems, and said first valve means, said solenoid valve means being effective to supply fluid to said second system when required by said second system providing flow requirements of said first system have been met.

2. A fluid regulator circuit for supplying fluid from a fluid source to first and second hydraulic systems wherein said first system operates at a first pressure range of $P_1$ and requires priority over said second system, and wherein said first and second systems have a common operating pressure range of $P_2$ which is higher than $P_1$ and a common relief pressure range of $P_3$ which is higher than $P_2$, which circuit is comprised of:

first and second fixed displacement pumping elements connected to said fluid supply source, said first fixed displacement pumping element connected by first conduit means to said first system, said second fixed displacement pumping element connected to said second system by a second conduit means;

third conduit means interconnecting said first and second conduit means;

check valve means situated in said third conduit means, said check valve means adapted to check flow in said first conduit from entering said second conduit means, said check valve further adapted to permit flow from said second conduit means to said first conduit means when the pressure within said first conduit means is lower than $P_1$ pressure;

valve means connected to said first and second conduit means, said valve means adapted to direct flow from said second pumping element to said first system within pressure range $P_1$ and adapted to direct flow to said second system within said pressure range $P_2$, and adapted to bypass excess flow from said first and second pumping elements to said fluid source in said pressure range $P_3$; and solenoid valve means in communication with said second system, said solenoid valve means being effective to initiate operating pressure $P_2$ in said second system and effective to bypass fluid from said second system to said fluid source in said pressure range $P_3$.

3. A fluid regulator circuit for supplying fluid from a fluid source to first and second hydraulic systems wherein said first system operates at a first pressure range of $P_1$ and requires priority over said second system, and wherein said second system has an operating pressure range of $P_2$ and said first and second systems have a common relief pressure range of $P_3$ which is higher than $P_1$, which circuit is comprised of:

first and second fixed displacement pumping elements in fluid communication with said fluid supply source, said first fixed displacement pumping element connected by first conduit means to said first system, said second fixed displacement pumping element connected to said second system by second conduit means;

third conduit means interconnecting said first and second conduit means;

check valve means situated in said third conduit means, said check valve means adapted to check flow in said first conduit from entering said second conduit means, said check valve further adapted to permit flow from said second conduit means to said first conduit means when the pressure within said first conduit means is lower than $P_1$ pressure;

valve means connected to said first and second conduit means downstream from said third conduit means; said valve means adapted to direct flow from said second pumping element to said first system within pressure range $P_1$ and adapted to interrupt flow through said second conduit when the requirements of said first system are met and direct flow to said second system, said valve means further adapted to bypass excess flow from said first and second pumping elements to said fluid source in pressure range $P_3$; and solenoid valve means in communication with said second system, said solenoid valve means being effective to initiate operating pressure $P_2$ in said second system and effective to bypass fluid from said second system to said fluid source in said pressure range $P_3$.

4. A fluid regulator circuit for supplying fluid from a fluid source to first and second hydraulic systems wherein said first system operates at a first pressure range of $P_1$ and requires priority over said second system, and wherein said first and second systems have a common operating pressure range of $P_2$ which is higher than $P_1$, and a common relief pressure range of $P_3$, which is higher than $P_2$, which circuit is comprised of:

first and second fixed displacement pumping elements connected to said fluid supply source, said first fixed displacement pumping element connected by first conduit means to said first system, said second fixed displacement pumping element connected to said second system by second conduit means;

third conduit means interconnecting said first and second conduit means;

check valve means situated in said third conduit means, said check valve means adapted to check flow in said first conduit from entering said second conduit means, said check valve further adapted to permit flow from said second conduit means to said first conduit means when the pressure within said first conduit means is lower than $P_1$ pressure;

first valve means connected to said first conduit means;

second valve means connected to said second conduit means, said second valve means adapted to direct flow from said second pumping element to said first system within pressure range $P_1$ and adapted to direct flow to said second system within said pressure range $P_2$, and said first and second valve means adapted to bypass excess flow from said first and second pumping elements to said fluid source in said pressure range $P_3$; and solenoid valve means in communication with said second pumping element, said second valve means and said second system, said solenoid valve means being effective to initiate operating pressure $P_2$ in said second system and effective to bypass fluid from said second system to said fluid source in said pressure range $P_3$.

References Cited

UNITED STATES PATENTS 3,011,308   12/1961   Wotring.

WILLIAM F. O'DEA, *Primary Examiner.*

H. COHN, *Assistant Examiner.*